United States Patent
Hivet

(10) Patent No.: US 12,202,758 B2
(45) Date of Patent: Jan. 21, 2025

(54) METHOD FOR EVALUATING THE SENSITIVITY OF A GLAZING TO FORMING QUENCH MARKS

(71) Applicant: SAINT-GOBAIN GLASS FRANCE, Courbevoie (FR)

(72) Inventor: Romain Hivet, Saint-Ouen (FR)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 667 days.

(21) Appl. No.: 17/442,468

(22) PCT Filed: Mar. 31, 2020

(86) PCT No.: PCT/EP2020/059113
§ 371 (c)(1),
(2) Date: Sep. 23, 2021

(87) PCT Pub. No.: WO2020/207859
PCT Pub. Date: Oct. 15, 2020

(65) Prior Publication Data
US 2022/0169553 A1  Jun. 2, 2022

(30) Foreign Application Priority Data

Apr. 11, 2019 (EP) .................................... 19305471

(51) Int. Cl.
*C03B 27/04* (2006.01)
*G01N 21/23* (2006.01)

(52) U.S. Cl.
CPC ...... *C03B 27/0417* (2013.01); *C03B 27/0413* (2013.01); *G01N 21/23* (2013.01); *Y02P 90/02* (2015.11)

(58) Field of Classification Search
CPC ............ C03B 27/0417; C03B 27/0413; G01N 21/23; Y02P 90/02; G05B 19/41875
See application file for complete search history.

(56) References Cited

U.S. PATENT DOCUMENTS 10,611,664 B2 * 4/2020 Lezzi .................... C03C 3/078
11,987,517 B2 * 5/2024 Schnabel, Jr. ...... C03B 27/0404

FOREIGN PATENT DOCUMENTS

| FR | 3 067 111 A1 | 12/2018 | |
| WO | WO 2018/051029 A1 | 3/2018 | |
| WO | WO-2019150021 A1 * | 8/2019 | ....... B32B 17/10036 |

OTHER PUBLICATIONS

Maccariello et al., Coatings Sensitivity to the Quench Marks, 2022, Challenging Glass Proceedings, CGC 2022, vol. 8, pp. 1-10 (Year: 2022).*

(Continued)

*Primary Examiner* — Mi'schita' Henson
(74) *Attorney, Agent, or Firm* — Pillsbury Winthrop Shaw Pittman LLP

(57) ABSTRACT

A method for evaluating the sensitivity of a glazing to forming quench marks depending on its anisotropy, the sensitivity being evaluated by computing parameter $\sigma_y$, the quench marks resulting from different optical phase shifts in different regions of the glazing for a vision in transmission or reflection and from either side of the glazing, the method including computing a transmission parameter T1, T2 through face 1 or 2 or a reflection parameter R1, R2 from face 1 or 2, this computation being done for a region of the glazing without optical phase shift and for a region of the glazing inducing an optical phase shift $\delta$; computing a parameter $\Delta E(\delta)$ corresponding to the color difference between said regions, based on at least one of T1, T2, R1, R2, and computing $\sigma_y$ by applying a function G dependent on computed $\Delta E(\delta)$ and where appropriate on the one or more corresponding $\delta$.

18 Claims, 3 Drawing Sheets

(56) References Cited

OTHER PUBLICATIONS

KR International Search Report as issued in International Patent Application No. PCT/EP2020/059113, dated Jun. 17, 2020.

* cited by examiner

METHOD FOR EVALUATING THE SENSITIVITY OF A GLAZING TO FORMING QUENCH MARKS

CROSS-REFERENCE TO RELATED APPLICATIONS

This application is the U.S. National Stage of PCT/EP2020/059113, filed Mar. 31, 2020, which in turn claims priority to European patent application number 19305471.5 filed Apr. 11, 2019. The content of these applications are incorporated herein by reference in their entireties.

The invention relates to the field of thermally toughened glass, in particular the glass referred to as heat strengthened glass, which is also called "semi-tempered" glass, or the glass referred to as thermally tempered glass, and more particularly such glasses coated with at least one thin layer.

The glasses to which the present patent application relates may in particular be intended for the curtain walls of buildings, urban furniture and the glazings of transportation vehicles (motor vehicles, buses, trains, boats and ships, airplanes, etc.).

The processes used to toughen glass thermally, in particular thermal tempering or heat strengthening, involve heating above 600° C. followed by rapid cooling with air jets. To this end, the glass is heated in a furnace, in particular a radiative or convective furnace, then cooled using a cooling device generally comprising quench chambers that administer, to the glass, a plurality of air jets that are emitted via nozzles. In most installations for producing thermally toughened glass, the glass is conveyed horizontally via a bed of rollers. The speed of the air jets is adjusted depending on the thickness of and on the stress level desired in the final glass.

In the context of the present invention, the expression thermal toughening is a general expression covering heat strengthening and thermal tempering. Thermally toughening glass generates a stress field in the thickness of the glass, providing it with a greater mechanical resistance to flexion and causing it to break in a specific manner that may, in particular in the case of tempered glass, reduce the risk of human injury in the case of breakage. This stress field is due to the differential in cooling rate between the surfaces of the main faces of the glass and its core, as the glass sets. The thicker the glass, the less necessary it is to blow strongly to generate the residual stress field, because of the higher thermal inertia of the core to cooling.

The air jets used for the cooling are generally applied simultaneously to both main faces of the glass. They may be blown between the rollers used to convey the glass sheets. The use of air jets does not allow uniform cooling of the entirety of the glass to be guaranteed. The use of glasses coated with layers, in particular low-E layers, may moreover complicate the set-up of the heating furnace. A nonuniformity, which may potentially be large, in glass temperature field is observed, temperature gradients of several tens of degrees C. over a distance of only a few centimeters sometimes being measured when the glass exits from the furnace to then be cooled. Depending on its thermal history and because of the photo-elastic properties of the glass, this may result, under polarized light, in the appearance of iridescence, this iridescence being well known to those skilled in the art as "quench marks" or "strain patterns" ("marques de trempe" or "fleur de trempe" in French) or "leopard spots", these expressions also being used for heat strengthened glass, which is also referred to as "semi-tempered" glass. This nonuniformity in the glass is attributed to a nonuniform and anisotropic stress distribution inside the glass. This stress distribution firstly depends on the thermal history of the glass, i.e. on the uniformity of the heating and cooling used to thermally toughen it.

Various solutions have already been proposed to decrease the quench marks of thermally toughened glasses, in particular as proposed in WO2018051029.

A coating applied to a glass may modify the appearance of its quench marks, either by emphasizing them, or by concealing them. There is currently no simple means for predicting before it is produced the influence that a coating will have on the quench marks of a thermally toughened glass, and one subject of the present invention is to remedy this deficiency.

According to the invention, the quench marks of a glazing are considered to be the result of differences in color between various regions of the glazing. As the origin of these quench marks is a stress anisotropy and as regions of different stresses induce different optical phase shifts in the light rays, giving the latter a different color, the idea was had to establish a measurement scale based on the computable color difference between a region of the substrate devoid of optical phase shift and a region of the same substrate inducing a given optical phase shift. This measurement scale allows glazings to be compared for identical optical phase shifts and identical angles of light-ray incidence. It is therefore possible to simulate, before their production, glazings to be thermally toughened under identical conditions, i.e. glazings having regions inducing the same optical phase shifts and regions devoid of optical phase shift. It is also possible, by virtue of this method, to evaluate the influence of a coating system on the concealment or emphasis of quench marks, by comparing the glazing comprising the coating system with the same glazing devoid of the coating system. In the context of the present invention, a coating system is a coating placed on a single face of the glazing or is the combination of two coatings each placed on a different main face of the glazing, it being understood that a coating is a thin layer or a stack of thin layers.

The present invention is applicable to glazings comprising a glazing substrate, whether coated or not on one or both of its main faces with a thin layer or a stack of thin layers. The two main faces of a glazing make contact with an exterior environment of the glazing, such as for example ambient air. A glazing substrate comprises at least one glass sheet. A glazing substrate may be laminated and therefore comprise at least two glass sheets separated by an interlayer made of a polymer such as PVB. The glazing substrate has substantially the same refractive index right through its thickness. The PVB has substantially the same refractive index as the glass. In the present patent application, the expression "glazing substrate" designates the one or more glass sheets and the one or more optional polymer interlayers, but excludes any thin layers. The invention is not applicable to glazings the glazing substrate of which contains a thin layer inserted between its two main faces (such as a laminated glazing comprising a thin layer between one of its glass sheets and the polymer interlayer).

In the context of the present invention, an optical phase shift observed for a region of a glazing is considered to be induced by the glazing substrate that it contains and not by the one or more thin layers potentially arranged on this glazing substrate. A thin layer or a stack of thin layers merely modifies the appearance of a quench-mark pattern.

The invention is applicable to transparent glazings, i.e. glazings that let visible light pass. Thus, any material contained in the glazing (glass, polymer interlayer, thin layer) lets visible light pass.

A thin layer or a stack of thin layers generally has a thickness comprised in the domain ranging from 0.5 to 350 nm.

A thin layer may perform one or more of the following functions:
antireflection,
solar control,
low-E,
anti-condensation,
self-cleaning.

A thin layer may be chosen from the following list of materials: silver, zinc oxide, silicon nitride, silicon oxide, titanium dioxide, tin oxide, ITO.

Quench marks may be likened to a variation in color in various regions of a substrate receiving polarized light as seen by an observer looking at the glazing. The light coming from the glazing and seen by the observer may be light that has passed through the glazing, in which case it is said to be "in transmission", or light reflected by the glazing, in which case it is said to be "in reflection". The quench marks may affect light in transmission and/or light in reflection. The parameter $\Delta E$ referred to as the color difference, such as defined for example by the International Commission on Illumination (CIE), is considered to be representative of color differences produced by quench marks. According to the 1976 CIE formula, it will be recalled that:

$$\Delta E^* = \sqrt{(L_2^* - L_1^*)^2 + (a_2^* - a_1^*)^2 + (b_2^* - b_1^*)^2}$$

in which $L_1^*, a_1^*, b_1^*$ are the coordinates in the CIELab color space of the first color to be compared and $L_2^*, a_2^*, b_2^*$ are those of the second. A different definition of color difference, in particular a more recent definition of $\Delta E$, may be used in the context of the present invention, such as one of the following definitions: the 1994 CIE version, the CIEDE2000 version, or the CMC l:c (1984) version. In each and every case, $\Delta E$ represents a distance between two points corresponding to two different colors in a given color space.

In the context of the present invention, a parameter $\sigma_v$ for characterizing the tendency of a glazing to exhibit quench marks has been devised. This parameter $\sigma_v$ is based on the determination of the color difference between a point of the glazing devoid of optical delay and a point of the glazing that induces an optical phase shift. Advantageously, the parameter $\sigma_v$ may be independent of or weakly dependent on the optical phase shift induced by the glazing substrate contained in the glazing.

The invention relates to a method for evaluating the sensitivity of a glazing to forming quench marks depending on its anisotropy, said sensitivity being evaluated by computing a parameter $\sigma_v$, said glazing comprising a face 1 and a face 2, both making contact with an exterior environment, said quench marks resulting from different optical phase shifts in different regions of the glazing for a vision in transmission or in reflection and from either side of the glazing, said method comprising
a computer-implemented step of computing at least one parameter of transmission through face 1 or through face 2, called T1 or T2, or at least one parameter of reflection from face 1 or from face 2, called R1 and R2, this computation being carried out on the one hand for a region of the glazing inducing no optical phase shift and on the other hand for a region of the glazing having birefringence axes oriented at a given angle with respect to the plane of incidence and inducing an optical phase shift $\delta$ in a light ray in a given optical phase-shift domain, for a given polarization of the light ray and for a given angle of incidence of the light ray;
a computer-implemented step of computing at least one parameter $\Delta E(\delta)$ corresponding to the color difference between the region of the glazing inducing no optical phase shift and the region of the glazing inducing the optical phase shift $\delta$, on the basis of at least one of the parameters T1, T2, R1, R2, then
computing $\sigma_v$ by applying a function G dependent on the one or more computed $\Delta E(\delta)$ and where appropriate on the one or more corresponding $\delta$.

According to the model of the present invention, the optical phase shift $\delta$ is independent of wavelength in the visible spectrum.

Preferably, the angle of the birefringence axes with respect to the plane of incidence is 45° and the polarization is s- or p-, because this corresponds to the observation conditions that produce the most visible quench marks.

The function G computes $\sigma_v$ from at least one $\Delta E(\delta)$ and where appropriate each corresponding $\delta$ to deliver a value of $\sigma_v$ having a meaning on a measurement scale. It is therefore possible to write $\sigma_v = G(\Delta E(\delta), \delta)$. This therefore in particular makes it possible to choose G such that $\sigma_v = \Delta E(\delta)$. To a $\Delta E(\delta)$ corresponds a given $\delta$. If a plurality of $\Delta E(\delta)$ are computed, each $\Delta E(\delta)$ is computed for a different $\delta$.

The function G may also be equal to an arbitrary function F2 depending only on a $\sigma_\delta$ determined for a given $\delta$ or on a plurality of $\sigma_\delta$ each determined for a different $\delta$, each $\sigma_\delta$ being equal to the quotient of $\Delta E(\delta)$ divided by a function F1($\delta$) dependent only on the corresponding $\delta$ ($\sigma_\delta = \Delta E(\delta)/F1(\delta)$). It is possible to write $G = F2(\sigma_\delta)$. In particular, the function F2 may be a polynomial function of the one or more $\sigma_\delta$.

It is advantageous for the one or more $\sigma_\delta$ to be independent of or weakly dependent on the optical phase shift induced by the glazing because the $\sigma_v$ will also be and will thus be more representative of the effect of the coating on the quench marks for a broader domain of optical phase shifts. In the search for a function F1 that would make the one or more $\sigma_\delta$ independent of or weakly dependent on optical phase shift, the assumption was made, empirically and intuitively, that F1($\delta$) could advantageously be close or equal to $\sin^2\delta$. With $F1(\delta) = \sin^2\delta$, it has been observed that the smaller the optical phase shift $\delta$, the more $\sigma_\delta$ is independent of the optical phase shift $\delta$. For this reason, the relevant optical phase-shift domain in the context of the invention is preferably close to zero and starts at zero. In particular, the limit of $\sigma_\delta$ when $\delta$ tends toward 0 is a good value of $\sigma_v$ for characterizing a glazing. Indeed, it has been observed that the quotient $\Delta E(\delta)/\sin^2(\delta)$ is substantially independent of $\delta$, above all for low values of $\delta$ (especially $\delta < \pi/2$, in particular $\delta < \pi/15$ and above all for $\delta < \pi/30$), this corresponding to the most commonplace cases. Of course, functions other than the sine function and returning values close to those given by the sine function may potentially be suitable for use as the function F1. For example, a limited development of the sine function is generally suitable. To give another example, for particularly low values of $\delta$, such as $\delta < \pi/30$, $F1 = \delta^2$ may also be suitable. For this reason, it has been considered to be satisfactory to choose an F1($\delta$) that returns a value comprised between $(\sin^2\delta) - 1$ and $(\sin^2\delta) + 1$ and preferably between $(\sin^2\delta) - 0.5$ and $(\sin^2\delta) + 0.5$.

The value of $\sigma_v$ characterizing a glazing may be determined using a single $\sigma_\delta$ for a given optical phase-shift value or using a plurality of $\sigma_\delta$, each $\sigma_\delta$ being determined for a different value of optical phase shift $\delta$. The value $\sigma_v$ may be determined using a function $F2(\sigma_\delta)$ depending only on one or more $\sigma_\delta$. This function $F2(\sigma_\delta)$ is arbitrary and allows a glazing to be characterized on an arbitrary measurement scale. On this measurement scale, it is possible to compare the $\sigma_{v1}$ of a glazing V1 comprising a glazing substrate and a coating system with the $\sigma_{v2}$ of a glazing V2 comprising the same glazing substrate, but devoid of the coating system, so as to be able to evaluate whether the coating system will emphasize the quench marks ($\sigma_{v1} > \sigma_{v2}$) or conceal the quench marks ($\sigma_{v1} < \sigma_{v2}$) with respect to the bare glazing substrate. This comparison is of course carried out with the two glazings V1 and V2 using the same measurement scale and therefore the same values of $\delta$ and the same functions G, F1 and F2. It will be noted that the glazing V2 may very well already comprise a thin layer or a stack of thin layers on one or both of its two main faces, the coating system of V1 adding a thin layer or a stack of thin layers to that or those already present on V2. Thus, it is therefore possible to simulate, before production of a coating system, the effect that said coating system will have on the quench marks of a glazing, and to choose the most suitable coating system.

If a single $\sigma_\delta$ is determined, then the function $F2(\sigma_\delta)$ may for example simply be equal to $\sigma_\delta(\sigma_v = \sigma_\delta)$. The function $F2(\sigma_\delta)$ may be a polynomial of $\sigma_\delta$. In particular, the function $F2(\sigma_\delta)$ may be a coefficient of proportionality k ($\sigma_v = k \cdot \sigma_\delta$). The function $F2(\sigma_\delta)$ may also be the addition or subtraction of a constant value x.

If a $\sigma_v$ is determined from a plurality of $\sigma_\delta$, in a given domain of the optical phase shift $\delta$, this function $F2(\sigma_\delta)$ may for example be a polynomial function of a plurality of $\sigma_\delta$, such as in particular an arithmetic mean of the $\sigma_\delta$ in this domain of the optical phase shift $\delta$.

Whatever the function $F2(\sigma_\delta)$ chosen, the limit of $\Delta E/F1$ ($\delta$) when $\delta$ tends toward 0 (zero optical phase shift) is a preferred value of $\sigma_\delta$ because it has been observed that $\Delta E/F1(\delta)$ is more independent of $\delta$ when $\delta$ tends toward 0. Thus, advantageously, $\sigma_v = F2(\lim_{\delta \to 0} \Delta E/F1(\delta))$. In particular, $\sigma_v$ may simply be equal to the limit of $\sigma_\delta$ when $\delta$ tends toward 0. In particular, $\sigma_v = \lim_{\delta \to 0} \Delta E/\sin^2(\delta)$ is particularly suitable.

The domain of the optical phase shift $\delta$ is comprised between zero and $\pi$. Generally, it is enough for it to be comprised between zero and $\pi/2$ and even between zero and $\pi/15$ and even between zero and $\pi/30$. Indeed, it is values of $\delta$ closest to zero that lead to the $\sigma_\delta$ that are the most relevant because the least sensitive to variations in $\delta$.

The function $F2(\sigma_\delta)$ is preferably monotonic (it decreases or increases monotonically) as a function of $\delta$. The function $F2(\sigma_\delta)$ is arbitrary and freely chosen to generate a measurement scale. The function $F2(\sigma_\delta)$ may also be applied by computer.

To determine $\sigma_v$, it is possible to use (by applying the function $F2(\sigma_\delta)$) only a single value of $\sigma_\delta$ corresponding to a low $\delta$, in particular one lower than $\pi/2$, after having observed that this value of $\sigma_\delta$ varies little as a function of $\delta$ in the domain of $\delta$ in question, said domain starting at zero.

To determine $\sigma_v$, it is possible to use (by applying the function F2) a plurality of values of $\sigma_\delta$ corresponding to a plurality of low $\delta$, in particular all lower than $\pi/2$, after having observed that these values of $\sigma_\delta$ vary little as a function of $\delta$ in the domain of $\delta$ in question, said domain starting at zero.

Whether a single $\sigma_\delta$ is used or a plurality of $\sigma_\delta$ are used, the domain of $\delta$ is preferably chosen so that $\sigma_\delta$ varies by less than 0.5 and preferably less than 0.2 when $\delta$ passes from 0 to the highest value of this domain. If a $\sigma_\delta$ cannot be determined for $\delta$ equal to 0 (this is the case if $F1(\delta)$ is $\sin^2\delta$), it is possible to use as value of $\sigma_\delta$ at $\delta=0$ the limit of $\Delta E/F1(\delta)$ when $\delta$ tends toward 0 (which is denoted $\lim_{\delta \to 0} \Delta E/F1(\delta)$). Advantageously, the highest value of the domain for $\delta$ is lower than $\pi/15$ and preferably lower than $\pi/30$.

The iridescence effect of the quench marks depends greatly on the polarization state of the incident light and on the angle of incidence of the light ray with respect to the glazing substrate. Moreover, $\Delta E$ is generally maximum for an angle of incidence with respect to the glazing substrate comprised between 50 and 80° and therefore the angle of incidence is preferably chosen to be comprised in this domain, and is in particular set equal to 60°.

Generally, a glazing comprises two faces called face 1 and face 2, which make contact with an exterior environment. Each of these faces has intensity-wise transmission and reflection properties that are characteristic of the exterior/interior interface. These properties are represented by the following parameters:

$_x\tau_i(\theta)$: transmission coefficient of face i (1 or 2) for a polarization x (s- or p-);

$^{ext}_x\rho_i(\theta)$: reflection coefficient of exterior face i (1 or 2) for a polarization x (s- or p-);

$^{int}_x\rho_i(\theta)$: reflection coefficient of interior face i (1 or 2) for a polarization x (s- or p-);

namely 12 parameters in all for characterizing the interfaces with the exterior environment of the glazing. These parameters are all dependent on the wavelength and may therefore be represented by wavelength-dependent spectra.

These parameters $\tau$ and $\rho$ are either known, or measurable in a way known to those skilled in the art, in particular in the case of a thin layer or of a stack of thin layers. They are determinable (by measurements or computation) for any thin layer or stack of thin layers.

On the basis of these interface parameters, the transmission parameters (T1 and T2) and reflection parameters (R1 and R2) of the glazing may be computed for its two faces 1 and 2. T1 (T2, respectively) is the transmission coefficient of a light ray that passes through the glazing after striking face 1 (face 2, respectively) thereof. R1 (R2, respectively) is the reflection coefficient of the glazing for a light ray striking face 1 (face 2, respectively) thereof.

Generally, the polarization state changes after each passage through the glazing, and in particular after each reflection from an internal interface. In the particular case where the incident beam is polarized with polarization x (s- or p-polarization), where the birefringence axes of the substrate are oriented at 45° with respect to the plane of incidence and where the phase shift may be expressed as a fraction of $\pi$: $\delta = \pi/n$ ($\pi/2, \pi/3, \pi 4, \ldots$) the beam becomes once again polarized with the polarization x after 2n reflections. The interior reflection and transmission coefficients $_k\tau_i$ and $^{int}_k\rho_i$ are defined for the k (k=0, 1, 2, 3, etc. up to 2n) polarization states by the following equations:

$$_k\tau_i = \cos^2\left(\frac{k\pi}{2n}\right)_x\tau_i + \sin^2\left(\frac{k\pi}{2n}\right)_y\tau_i$$

$$^{int}_k\rho_i = \cos^2\left(\frac{k\pi}{2n}\right)^{int}_x\rho_i + \sin^2\left(\frac{k\pi}{2n}\right)^{int}_y\rho_i$$

in which the polarization y is the polarization orthogonal to x (x=s and y=p or x=p and then y=s). The $k^{th}$ polarization state corresponds to the polarization of a beam initially polarized x that has passed k times through the transparent substrate.

The parameter $_k\tau_i$ therefore represents the transmission coefficient of face i (1 or 2) for a ray initially of polarization x after having passed k times through the transparent substrate. The parameter $^{int}_k\rho_i$ represents the interior reflection coefficient of face i (1 or 2) for a ray initially of polarization x after having passed k times through the transparent substrate. As the beam becomes once again polarized with the polarization x after 2n reflections, it is possible to write to:

$$_0\tau_i = _{2n}\tau_i = _x\tau_i$$
$$^{int}_0\rho_i = ^{int}_{2n}\rho_i = ^{int}_x\rho_i$$

The parameters T1, T2, R1 and R2 may be determined by virtue of the following formulae:

$$T_1\left(\theta, \delta = \frac{\pi}{n}\right) = _0\tau_1 e^{-d\alpha} \times \frac{_1\tau_2 + \sum_{m=1}^{n-1} {_{2m+1}\tau_2}\, e^{-2md\alpha} \prod_{k=1}^{m} {^{int}_{2k-1}\rho_2}\, {^{int}_{2k}\rho_1}}{1 - e^{-2nd\alpha} \prod_{k=1}^{n} {^{int}_{2k-1}\rho_2}\, {^{int}_{2k}\rho_1}}$$

$$T_2\left(\theta, \delta = \frac{\pi}{n}\right) = _0\tau_2 e^{-d\alpha} \times \frac{_1\tau_1 + \sum_{m=1}^{n-1} {_{2m+1}\tau_1}\, e^{-2md\alpha} \prod_{k=1}^{m} {^{int}_{2k-1}\rho_1}\, {^{int}_{2k}\rho_2}}{1 - e^{-2nd\alpha} \prod_{k=1}^{n} {^{int}_{2k-1}\rho_1}\, {^{int}_{2k}\rho_2}}$$

$$R_1\left(\theta, \delta = \frac{\pi}{n}\right) =$$

$$^{ext}_x\rho_1 + _0\tau_1 {^{int}_1}\rho_2\, e^{-2d\alpha} \times \frac{_2\tau_1 + \sum_{m=1}^{n-1} {_{2m+1}\tau_1}\, e^{-2md\alpha} \prod_{k=1}^{m} {^{int}_{2k-1}\rho_2}\, {^{int}_{2k}\rho_1}}{1 - e^{-2nd\alpha} \prod_{k=1}^{n} {^{int}_{2k-1}\rho_2}\, {^{int}_{2k}\rho_1}}$$

$$R_2\left(\theta, \delta = \frac{\pi}{n}\right) =$$

$$^{ext}_x\rho_2 + _0\tau_2 {^{int}_1}\rho_1\, e^{-2d\alpha} \times \frac{_2\tau_2 + \sum_{m=1}^{n-1} {_{2m+2}\tau_2}\, e^{-2md\alpha} \prod_{k=1}^{m} {^{int}_{2k+1}\rho_1}\, {^{int}_{2k}\rho_2}}{1 - e^{-2nd\alpha} \prod_{k=1}^{n} {^{int}_{2k-1}\rho_1}\, {^{int}_{2k}\rho_2}}$$

in which d is the thickness of the glazing,

α is the coefficient of absorption of light of the glazing substrate,

θ is the angle of incidence,

δ is the optical phase shift induced by the glazing substrate and equal to π/n in which "n" is a positive integer, k and m are summation/product variables, defined in the expressions Σ and π.

On account of the small thickness of a thin layer or of a stack of thin layers, a glazing comprising a thin layer or a stack of thin layers is considered to have the same thickness as the same glazing devoid of any thin layers.

On the basis of at least one of these parameters T1, T2, R1, R2, which are known in the entire visible domain, a person skilled in the art will be able to compute the color difference $\Delta E_s(\theta, \delta=\pi/n)$ between an isotropic region of the glazing substrate inducing no optical phase shift and a region inducing an optical phase shift δ=π/n, for vision in transmission of face 1, or for vision in transmission of face 2, or for vision in reflection of face 1, or for vision in reflection of face 2. In $\Delta E_s$, the index S represents T1 or T2 or R1 or R2 so as to express the fact that there is a ΔE for each of these situations: transmission with incidence on face 1, transmission with incidence on face 2, reflection from face 1, reflection from face 2. The above formulae giving T1, T2, R1 and R2 allow for multiple reflections inside the glazing and multiple transmissions of partially reflected rays. The desired $\Delta E_s$ (S=T1 or T2 or R1 or R2) is chosen depending on the expected preponderant condition of observation of the glazing.

In the context of the invention, at least one of these parameters T1 or T2 or R1 or R2 applied to the glazing that it is proposed to study is firstly computed by computer. It is then possible to compute by computer a $\sigma_\delta$ (one $\sigma_\delta$ for each configuration T1, T2, R1, R2) using $$\sigma_\delta(\theta) = \Delta E_s(\theta, \delta) / F1(\delta)$$

for a given optical phase shift δ=(π/n), n being a positive integer number equal to 1 or 2 or 3 or 4, etc., in the region inducing an optical phase shift. This computation is advantageously performed by computer.

If n=2, the glazing locally has the effect of a quarter-wave plate. In the case of incidence of p-polarized light, the light changes polarization on each passage through the glazing in the following way: p-polarization→circular polarization→s-polarization→circular polarization→p-polarization→circular polarization, etc.

If n=2, the glazing locally has the effect of a quarter-wave plate. In the case of incidence of p-polarized light, the light changes polarization on each passage through the glazing in the following way: p-polarization→circular polarization→s-polarization→circular polarization→p-polarization→circular polarization, etc.

If n=2, the glazing locally has the effect of a quarter-wave plate. In the case of incidence of p-polarized light, the light changes polarization on each passage through the glazing in the following way: p-polarization→circular polarization→s-polarization→circular polarization→p-polarization→circular polarization, etc.

The transmission and reflection coefficients of the intermediate (circular) polarization state are:

$$_c\tau_i = 0.5\, _p\tau_i + 0.5\, _s\tau_i$$
$$^{int}_c\rho_i = 0.5\, ^{int}_p\rho_i + 0.5\, ^{int}_s\rho_i$$

The transmission and reflection parameters of the substrate are then:

$$T_1\left(\theta, \delta = \frac{\pi}{2}\right) = _p\tau_1\, _c\tau_2 e^{-d\alpha} \times \frac{1 + e^{-2d\alpha}\, ^{int}_c\rho_2\, ^{int}_s\rho_1}{1 - e^{-4nd\alpha} (^{int}_c\rho_2)^2\, ^{int}_s\rho_1\, ^{int}_p\rho_1}$$

$$T_2\left(\theta, \delta = \frac{\pi}{2}\right) = _p\tau_2\, _c\tau_1 e^{-d\alpha} \times \frac{1 + e^{-2d\alpha}\, ^{int}_c\rho_1\, ^{int}_s\rho_2}{1 - e^{-4nd\alpha} (^{int}_c\rho_1)^2\, ^{int}_s\rho_2\, ^{int}_p\rho_2}$$

$$R_1\left(\theta, \delta = \frac{\pi}{2}\right) = ^{ext}_p\rho_1 + _p\tau_1 {^{int}_c\rho_2}\, e^{-2d\alpha} \times \frac{_s\tau_1 + e^{-2d\alpha}\, ^{int}_c\rho_2\, ^{int}_s\rho_1\, _p\tau_1}{1 - e^{-4nd\alpha} (^{int}_c\rho_2)^2\, ^{int}_s\rho_1\, ^{int}_p\rho_1}$$

$$R_2\left(\theta, \delta = \frac{\pi}{2}\right) = ^{ext}_p\rho_2 + _p\tau_2 {^{int}_c\rho_1}\, e^{-2d\alpha} \times \frac{_s\tau_2 + e^{-2d\alpha}\, ^{int}_c\rho_1\, ^{int}_s\rho_2\, _p\tau_2}{1 - e^{-4nd\alpha} (^{int}_c\rho_1)^2\, ^{int}_s\rho_2\, ^{int}_p\rho_2}$$

If the function $\sin^2$ is used as the function F1 and since the optical phase shift is set here to δ=π/2 and $\sin^2(\pi/2)=1$, then:

$$\sigma_{\delta=\frac{\pi}{2}}(\theta) = \Delta E_S\left(\theta, \delta = \frac{\pi}{2}\right)$$

The invention also relates to a process for manufacturing a glazing comprising carrying out the method according to the invention applied to said glazing, followed by production of the glazing. The method according to the invention may be applied to two different glazing substrates V1 and V2 to be compared on the same measurement scale, leading to two parameters $\sigma_v$ denoted $\sigma_{v1}$ and $\sigma_{v2}$, respectively. Comparing $\sigma_{v1}$ and $\sigma_{v2}$ allows the glazing that should have less pronounced quench marks than the other to be determined. In particular, V1 may be identical to V2 except that it in addition comprises a coating system comprising a thin layer or a stack of thin layers on one or both of its two main faces. Before it is produced, it is therefore possible to determine whether the coating system is liable to conceal or emphasize the quench marks. The invention also relates to a process for manufacturing the glazing V1, comprising carrying out the method according to the invention applied to the glazings V1 and V2, then producing the coating system. In particular, the invention also relates to a process for manufacturing a glazing comprising applying a coating system to a glazing substrate, this involving using the method according to the invention with a view to choosing a coating system, then producing the coating system on the glazing substrate.

The invention also relates to a computer program containing program-code instructions or instruction segments for executing at least one computer-implemented computing step of the method according to the invention. The invention also relates to a computer-readable storage medium on which this computer program is stored.

EXAMPLE 1

It is proposed to determine the influence of a stack of thin layers comprising, in particular, a layer of 8 nm of silver on the quench marks of a glass sheet of Planiclear trademark (sold by Saint-Gobain Glass France) of 10 mm thickness.

Figure 1:
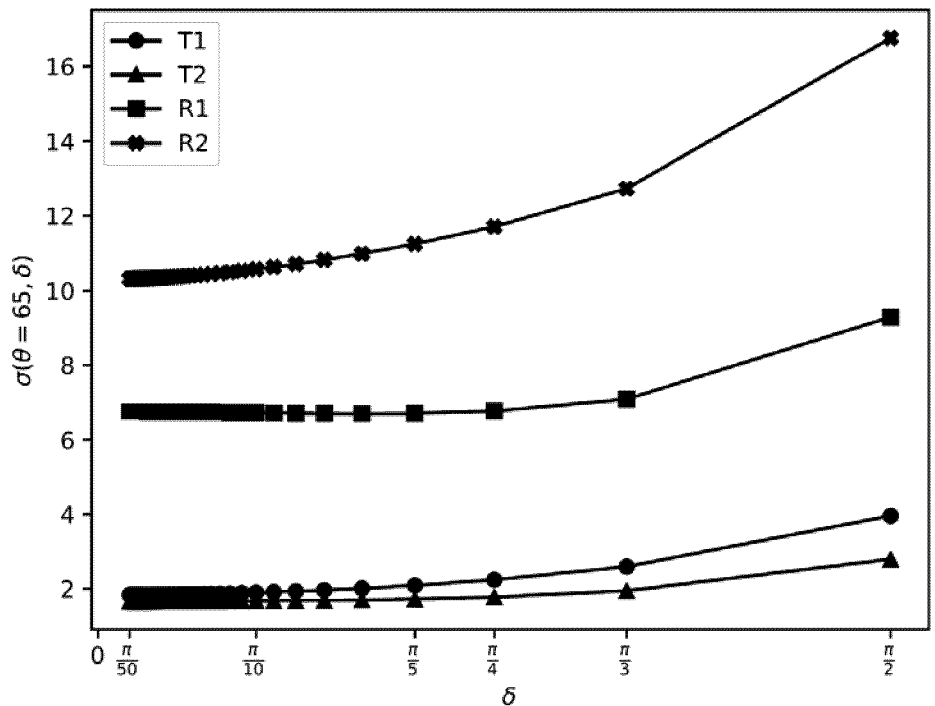
FIG. 1 is a graph that shows the variation of parameter $\sigma_\delta$ as a function of the optical phase shift for the configurations T1, T2, R1 and R2 and for a coated glass sheet.
Figure 2:
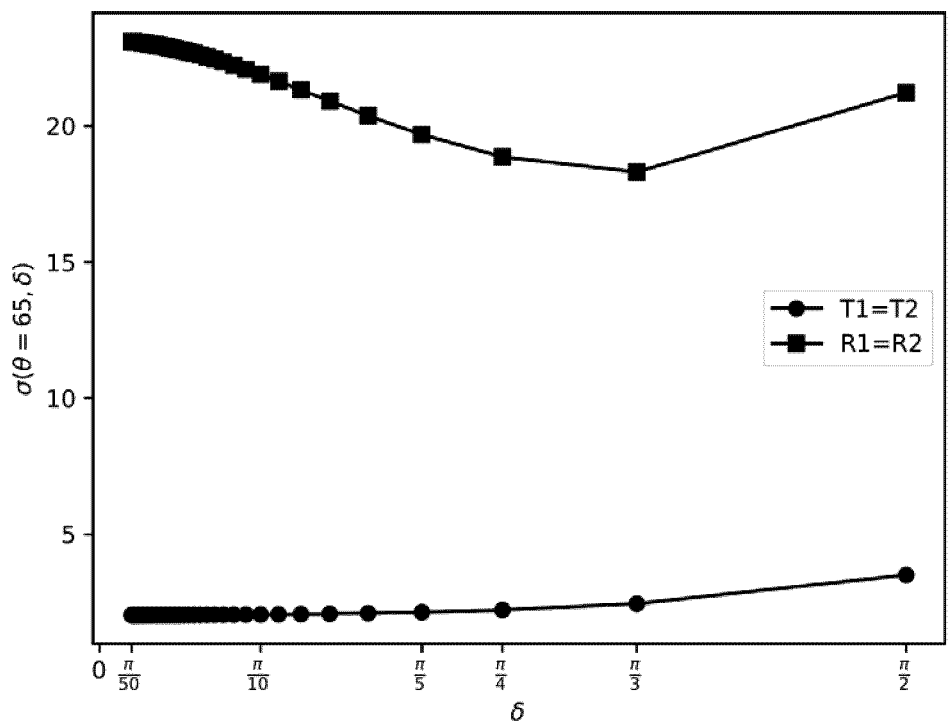
FIG. 2 is a graph that shows the variation of parameter $\sigma_\delta$ as a function of the optical phase shift for the configurations T1, T2, R1 and R2 and for an uncoated glass sheet.

To do this, values of $\sigma_\delta$ are determined for various values of the optical phase shift $\delta=\pi/n$, with n ranging from 2 to 50, for an angle of incidence of 65°, for the four spectra of the configurations T1, T2, R1 and R2, and for the coated glass sheet (see FIG. 1) and for the uncoated glass sheet (see FIG. 2).

It may be seen in FIGS. 1 and 2 that the smaller the optical phase shift $\delta$, the more $\sigma_\delta$ is independent of the optical phase shift $\delta$. For this reason, the relevant optical phase-shift domain in the context of the invention is preferably close to zero and starts at zero. In particular, the limit of $\sigma_\delta$ when $\delta$ tends toward 0 is a good value for characterizing a glazing.

In the case of the uncoated glass sheet (FIG. 2), as the glazing is symmetric, face 1 being identical to face 2, the values of $\sigma_\delta$ in T1 and in T2 are identical, and the values of $\sigma_\delta$ in R1 and in R2 are also identical. These values are here the Fresnel coefficients.

Comparing FIGS. 1 and 2 shows that the values of $\sigma_\delta$ in configurations T1 and T2 are hardly influenced by the coating. In contrast, for an identical optical phase shift, the values of $\sigma_\delta$ in configurations R1 and R2 are much lower in the presence of the coating. The coating will therefore have, for an angle of incidence of 65°, an effect that will, with respect to the bare glazing substrate, conceal quench marks in configurations R1 and R2.

Figure 3:
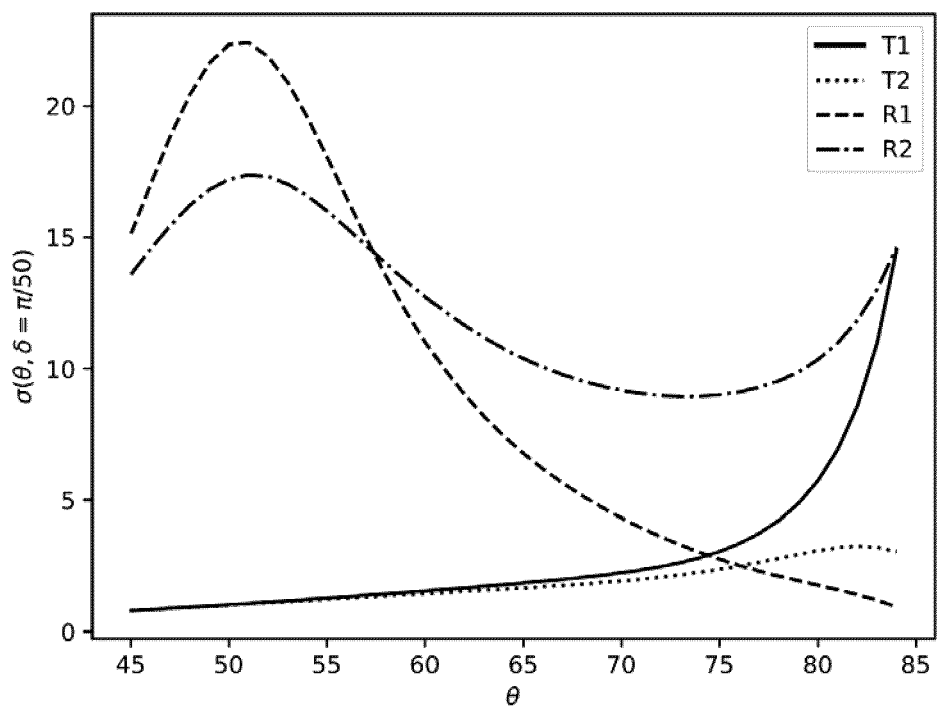
FIG. 3 is a graph that shows the variation of parameter $\sigma_\delta$ as a function of the angle of incidence for the configurations T1, T2, R1 and R2 and for a coated Planiclear glass sheet.
Figure 4:
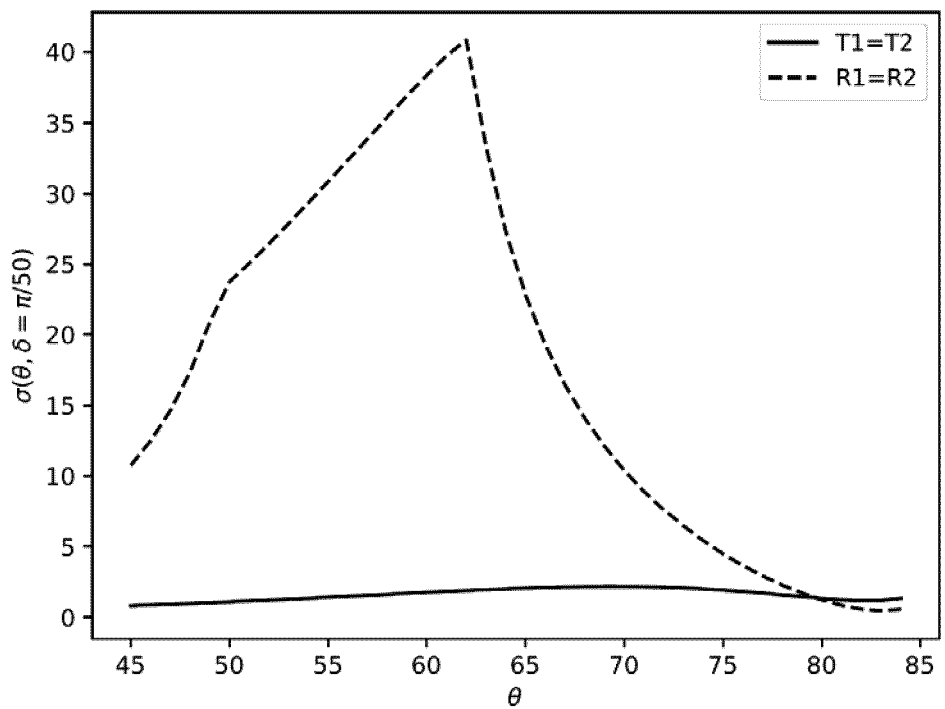
FIG. 4 is a graph that shows the variation of parameter $\sigma_\delta$ as a function of the angle of incidence for the configurations T1, T2, R1 and R2 and for a bare Planiclear glass sheet.

The limiting value of $\sigma_\delta$ when $\delta$ tends toward 0 has moreover been calculated, but for an angle of incidence varying from 45 to 85°. FIG. 3 shows the results for Planiclear coated with the coating and FIG. 4 shows the results for bare Planiclear.

The maximum sensitivity in the exterior reflection (R2) for the coated glass is from 17.5 to 51° whereas it is from 41 to 62° for the bare glass. On the whole, the coating will therefore have, with respect to the bare glazing substrate, an effect of concealing quench marks.

EXAMPLE 2

Figure 5:
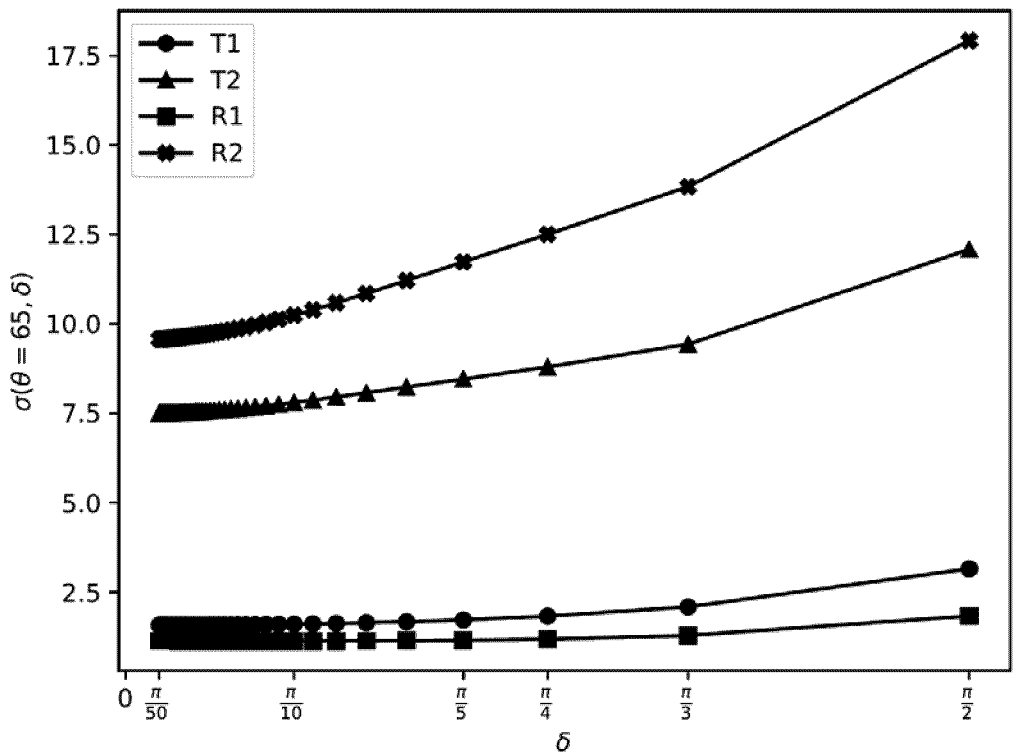
FIG. 5 is a graph that shows the variation of parameter $\sigma_\delta$ as a function of the optical phase shift for the configurations T1, T2, R1 and R2 and for a coated Planiclear glass sheet.
Figure 6:
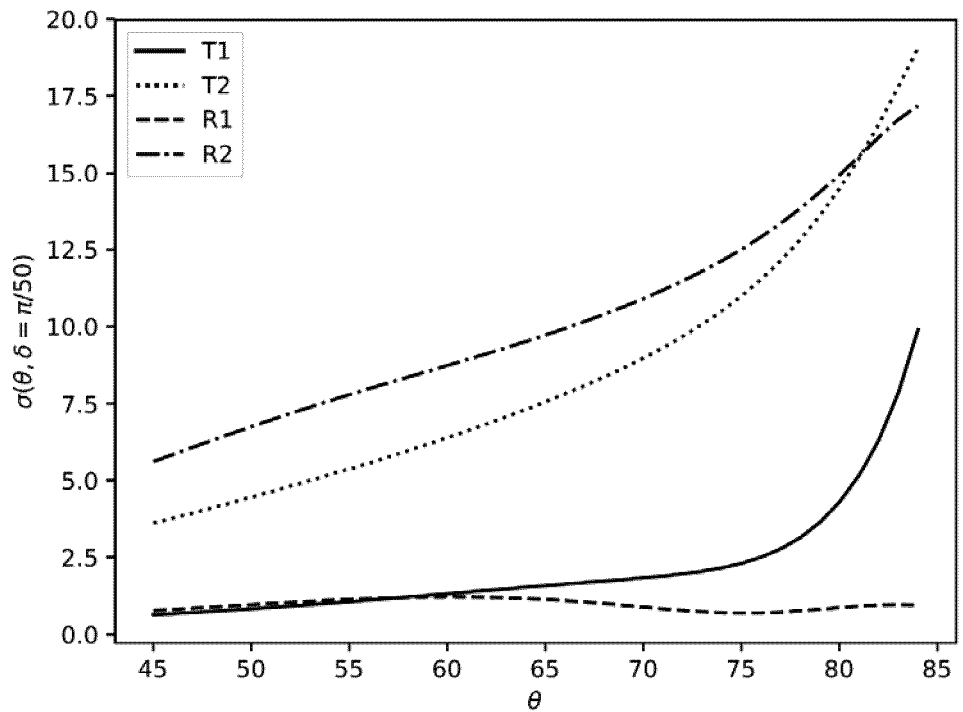
FIG. 6 is a graph that shows the variation of parameter $\sigma_\delta$ as a function of the angle of incidence for the configurations T1, T2, R1 and R2 and for a bare Planiclear glass sheet.

The process was the same as for example 1 except that the coating comprises a stack of thin layers comprising two silver layers of 12 and 22 nm thickness, respectively, deposited on face 1 of a Planiclear glass sheet of 10 mm thickness. FIG. 5 shows the results. Here again, the smaller the optical phase shift $\delta$, the more $\sigma_\delta$ is independent of the optical phase shift $\delta$. It is also possible to state that the coating will have, with respect to the bare glazing substrate, a concealing effect at 65° on quench marks in configurations R1 and R2 (compare with FIG. 2). The value of $\sigma_\delta$ when $\delta$ tends toward 0 has moreover been calculated, but for an angle of incidence varying from 45 to 85°. FIG. 6 shows the results. Here as well, the maximum sensitivity is lower with the coating than with the bare glass (compare with FIG. 4) and it may be stated that the coating attenuates the visibility of quench marks.

The invention claimed is:

1. A process for manufacturing a glazing comprising:
   carrying out a method, which is applied to said glazing, for evaluating a sensitivity of the glazing to forming quench marks depending on its anisotropy, said sensitivity being evaluated by computing a parameter $\sigma_v$, said glazing comprising a first face and a second face, both making contact with an exterior environment, said quench marks resulting from different optical phase shifts in different regions of the glazing for a vision in transmission or in reflection and from either side of the glazing, said method comprising
   a computer-implemented step of computing at least one parameter of transmission through the first face or through the second face, or at least one parameter of reflection from the first face or from the second face, said computation being carried out for a region of the glazing inducing no optical phase shift and for a region of the glazing having birefringence axes oriented at a given angle with respect to a plane of incidence and inducing an optical phase shift $\delta$ in a light ray in a given optical phase-shift domain, for a given polarization of the light ray and for a given angle of incidence of the light ray;

a computer-implemented step of computing at least one parameter $\Delta E(\delta)$ corresponding to a color difference between the region of the glazing inducing no optical phase shift and the region of the glazing inducing the optical phase shift $\delta$, on the basis of at least one of the parameters or transmission or reflection, then computing the parameter $\sigma_v$ by applying a function G dependent on the one or more computed $\Delta E(\delta)$ and where appropriate on the one or more corresponding optical phase shifts $\delta$, followed by production of the glazing.

2. The process as claimed in claim 1, wherein the function G is equal to an arbitrary function F2 depending only on a $\sigma_\delta$ determined for a given $\delta$ or on a plurality of $\sigma_\delta$ each determined for a different $\delta$, each $\sigma_\delta$ being equal to a quotient of $\Delta E(\delta)$ divided by a function $F1(\delta)$ dependent only on the corresponding $\delta$.

3. The process as claimed in claim 2, wherein the function F2 is a polynomial function of the one or more $\sigma_\delta$.

4. The process as claimed in claim 1, wherein the function $F1(\delta)$ delivers for each $\delta$ in question a value comprised between $(\sin^2 \delta)-1$ and $(\sin^2 \delta)+1$.

5. The process as claimed in claim 4, wherein the function $F1(\delta)$ delivers for each $\delta$ in question a value comprised between $(\sin^2 \delta)-0.5$ and $(\sin^2 \delta)+0.5$.

6. The process as claimed in claim 5, wherein the function $F1(\delta)$ is equal to $\sin^2 \delta$.

7. The process as claimed in claim 1, wherein the one or more optical phase shifts $\delta$ are comprised in an optical phase-shift domain ranging from 0 to $\pi/2$.

8. The process as claimed in claim 7, wherein the one or more optical phase shifts $\delta$ are comprised in an optical phase-shift domain ranging from 0 to $\pi/15$.

9. The process as claimed in claim 8, wherein the one or more optical phase shifts $\delta$ are comprised in an optical phase-shift domain ranging from 0 to $\pi/30$.

10. The process as claimed in claim 2, wherein the one or more $\sigma_\delta$ used for the computation of $\sigma_v$ are chosen for a domain of the optical phase shift $\delta$ in which $\sigma_\delta$ varies by less than 0.5 when $\delta$ passes from the limit of $\Delta E/F1(\delta)$ when $\delta$ tends toward 0 to the highest value in this domain.

11. The process as claimed in claim 10, wherein the one or more $\sigma_\delta$ used for the computation of $\sigma_v$ are chosen for a domain of the optical phase shift $\delta$ in which $\sigma_\delta$ varies by less than 0.2 when $\delta$ passes from the limit of $\Delta E/F1(\delta)$ when $\delta$ tends toward 0 to the highest value in this domain.

12. The process as claimed in claim 2, wherein $\sigma_v = F2(\lim_{\delta \to 0} \Delta E/F1(\delta))$.

13. The process as claimed in claim 12, wherein $\sigma_v = \lim_{\delta \to 0} \Delta E/F1(\delta)$.

14. The process as claimed in claim 13, wherein $\sigma_v = \lim_{\delta \to 0} \Delta E/\sin^2(\delta)$.

15. The process as claimed in claim 1, wherein the method is applied to two different glazing substrates V1 and V2 to be compared on a same measurement scale, leading to two parameters $\sigma_v$ denoted $\sigma_{v1}$ and $\sigma_{v2}$, respectively.

16. The process as claimed in claim 15, wherein the glazing substrate V1 is identical to the glazing substrate V2 except that the glazing substrate V1 further comprises a coating system comprising a thin layer or a stack of thin layers on one or both of the first and second faces.

17. A non-transitory computer-readable storage medium on which a computer program comprising program-code instructions or instruction segments for executing at least one computer-implemented computing step of the process of claim 1 is stored.

18. A process for manufacturing a glazing, comprising:
carrying out a method, for evaluating a sensitivity of the glazing to forming quench marks depending on its anisotropy, said sensitivity being evaluated by computing a parameter $\sigma_v$, said glazing comprising a first face and a second face, both making contact with an exterior environment, said quench marks resulting from different optical phase shifts in different regions of the glazing for a vision in transmission or in reflection and from either side of the glazing, said method comprising a computer-implemented step of computing at least one parameter of transmission through the first face or through the second face, or at least one parameter of reflection from the first face or from the second face, said computation being carried out for a region of the glazing inducing no optical phase shift and for a region of the glazing having birefringence axes oriented at a given angle with respect to a plane of incidence and inducing an optical phase shift $\delta$ in a light ray in a given optical phase-shift domain, for a given polarization of the light ray and for a given angle of incidence of the light ray;

a computer-implemented step of computing at least one parameter $\Delta E(\delta)$ corresponding to a color difference between the region of the glazing inducing no optical phase shift and the region of the glazing inducing the optical phase shift $\delta$, on the basis of at least one of the parameters or transmission or reflection, then computing the parameter $\sigma_v$ by applying a function G dependent on the one or more computed $\Delta E(\delta)$ and where appropriate on the one or more corresponding optical phase shifts $\delta$, wherein the glazing comprises a coating system comprising a thin layer or a stack of thin layers on one or both of the first and second faces, then producing the coating system.

* * * * *

UNITED STATES PATENT AND TRADEMARK OFFICE
CERTIFICATE OF CORRECTION

| | | |
|---|---|---|
| PATENT NO. | : 12,202,758 B2 | Page 1 of 1 |
| APPLICATION NO. | : 17/442468 | |
| DATED | : January 21, 2025 | |
| INVENTOR(S) | : Romain Hivet | |

It is certified that error appears in the above-identified patent and that said Letters Patent is hereby corrected as shown below:

In the Specification

At Column 9, Lines 31-52 should read as follows:
Brief Description of the Drawings
Figure 1 is a graph that shows the variation of parameter $\sigma_\delta$ as a function of the optical phase shift for the configurations T1, T2, R1 and R2 and for a coated glass sheet;
Figure 2 is a graph that shows the variation of parameter $\sigma_\delta$ as a function of the optical phase shift for the configurations T1, T2, R1 and R2 and for an uncoated glass sheet;
Figure 3 is a graph that shows the variation of parameter $\sigma_\delta$ as a function of the angle of incidence for the configurations T1, T2, R1 and R2 and for a coated Planiclear glass sheet;
Figure 4 is a graph that shows the variation of parameter $\sigma_\delta$ as a function of the angle of incidence for the configurations T1, T2, R1 and R2 and for a bare Planiclear glass sheet;
Figure 5 is a graph that shows the variation of parameter $\sigma_\delta$ as a function of the optical phase shift for the configurations T1, T2, R1 and R2 and for a coated Planiclear glass sheet, and
Figure 6 is a graph that shows the variation of parameter $\sigma_\delta$ as a function of the angle of incidence for the configurations T1, T2, R1 and R2 and for a bare Planiclear glass sheet.

Signed and Sealed this
Eighteenth Day of February, 2025

Coke Morgan Stewart
*Acting Director of the United States Patent and Trademark Office*